(12) United States Patent
Roberto, Jr. et al.

(10) Patent No.: US 10,144,468 B2
(45) Date of Patent: Dec. 4, 2018

(54) BICYCLE RIDING TRAINING AID

(71) Applicant: TSL ENTERPRISES LLC, Wayne, NJ (US)

(72) Inventors: Richard Roberto, Jr., Wayne, NJ (US); Richard G Roberto, Tampa, FL (US)

(73) Assignee: TSL Enterprises, LLC, Wayne, NJ (US)

( * ) Notice: Subject to any disclaimer, the term of this patent is extended or adjusted under 35 U.S.C. 154(b) by 40 days.

(21) Appl. No.: 15/456,900

(22) Filed: Mar. 13, 2017

(65) Prior Publication Data

US 2018/0257723 A1    Sep. 13, 2018

(51) Int. Cl.
| | |
|---|---|
| *B62H 3/08* | (2006.01) |
| *B62H 7/00* | (2006.01) |
| *B62H 1/10* | (2006.01) |
| *G09B 19/00* | (2006.01) |
| *G09B 19/16* | (2006.01) |
| *A63B 69/16* | (2006.01) |

(52) U.S. Cl.
CPC .............. *B62H 1/10* (2013.01); *A63B 69/16* (2013.01); *B62H 7/00* (2013.01); *G09B 19/0038* (2013.01); *G09B 19/16* (2013.01); *A63B 2069/163* (2013.01); *A63B 2069/164* (2013.01); *B62H 2700/00* (2013.01)

(58) Field of Classification Search
CPC ... B62H 3/00; B62H 3/08; B62H 7/00; B62H 2700/00; A63B 69/16; A63B 2069/163; A63B 2069/164

USPC ....... 280/293, 296, 299, 288.4, 827; 211/17; 434/61; 482/61

See application file for complete search history.

(56) References Cited

U.S. PATENT DOCUMENTS

| | | | | |
|---|---|---|---|---|
| 359,800 | A * | 3/1887 | McClintock | B62H 3/08 211/20 |
| 1,156,567 | A * | 10/1915 | Vermeer | B62H 1/00 280/299 |
| 4,026,546 | A * | 5/1977 | Omori | A63B 69/16 211/22 |
| 4,730,840 | A * | 3/1988 | Goldmeier | B62H 1/12 280/210 |
| 6,155,833 | A * | 12/2000 | Lenihan | A63G 19/20 434/29 |
| 6,709,000 | B1 * | 3/2004 | Blake | B62H 1/12 280/293 |
| 7,736,282 | B1 * | 6/2010 | Horowitz | A63B 69/16 482/57 |
| 2009/0250564 | A1 * | 10/2009 | Glover | B60P 3/073 248/125.3 |

* cited by examiner

*Primary Examiner* — Joseph M Rocca
*Assistant Examiner* — Daniel S Yeagley
(74) *Attorney, Agent, or Firm* — Larson & Larson, P.A.; Justin P. Miller; Frank Liebenow

(57) ABSTRACT

A bicycle support device that includes a stabilization platform, the platform interfacing with bicycle training wheels. When the training wheels are engaged within the cavities of the stabilization platform, the rear wheel of the bicycle is elevated. The elevation, in combination with a slot within the platform, allows the rear wheel of the bicycle to rotate freely.

16 Claims, 8 Drawing Sheets

BICYCLE RIDING TRAINING AID

FIELD

This invention relates to the field of bicycle accessories and more particularly to a device that stabilizes a standard bicycle, allowing the bicycle to be used for stationary training.

BACKGROUND

Learning to ride a bicycle is a fixture of childhood. A common scene includes a parent holding a child's seat, running behind the child, and finally letting go, allowing the child to balance by herself.

While this scene seems romantic, the next scene often includes the child riding into the bushes, or falling onto the street. Riding a bicycle is a complex task. Successful training requires building on skills one-at-a-time, rather than all at once.

Mastering a bicycle requires the rider to learn balance, coordination, and the motion of pedaling. Mastering each of these three skills requires practice.

Bicycle training wheels installed on a standard bicycle are a helpful aid, reducing the burden on the child to learn balance. But the child must still simultaneously learn coordination of steering with the motion of pedaling.

Additionally, all of the drawbacks discussed above apply equally to adults. Some adults never learned to ride as children, or have lost their ability for lack of practice. Thus, for them, focusing on specific skills is just as helpful.

What is needed is a device that changes an ordinary bicycle into a stationary bicycle, allowing the child to focus on learning the motion of pedaling without fear of falling, or the risk of steering into a hazard.

SUMMARY

The disclosed bicycle support device includes a stabilization platform that interfaces with bicycle training wheels. When the training wheels are engaged within the cavities of the stabilization platform, the rear wheel of the bicycle is elevated. The elevation, in combination with a slot within the platform, allows the rear wheel of the bicycle to rotate freely.

Side-to-side motion, or tipping, is prevented by the position of the training wheels within the wheel cavities of the platform. Front-to-back motion is also prevented by the wheel cavities, which are of sufficient size to prevent the training wheels from rolling out. Additionally, each training wheel may be held to the platform by an optional strap. Each optional strap wraps around a training wheel, passing through a strap slot and under the platform. The optional straps create a positive lock between each training wheel and the platform.

Additional features further provide stabilization of the front wheel. An optional third strap is wrapped around the downtube of the bicycle and through the bicycle front wheel. When tightened, this strap prevents movement of the handlebars, further stabilizing the bicycle.

For children who are comfortable with some steering motion, the optional third strap is loosened or removed.

Returning to the platform, the platform shape is intended to accommodate the cavities and slots necessary to support and secure the bicycle. The resulting platform shape is less critical than the relative positions of the cavities and slots.

Multiple cavities and slots within the platform allow it to accommodate a bicycle.

Included are first and second training wheel cavities. Each training wheel cavity has a length and a width. The width is large enough to allow bicycle training wheels with both wide and narrow stances to interface with the cavities. The length is large enough to allow a training wheel to sit within the cavity, but small enough to prevent the training wheel from resting on the surface below the platform.

A central wheel slot allows the rear wheel of the bicycle to rotate without contacting the platform or the surface below.

Optional strap slots are placed fore or aft of the training wheel cavities. The optional strap slots allow the optional first and second straps to pass through the platform after wrapping around the training wheels. In the preferred embodiment the straps are nylon with a hook-and-loop closure system, but other types of straps may perform the same purpose.

An optional fender is included with the device for installation on the bicycle. The optional fender encloses a portion of the rear wheel of the bicycle, preventing accidental contact and injury due to contact with the spinning wheel.

A second embodiment of the platform includes a removable central section that is used to stabilize the front wheel of the bicycle. The removable section slides into the platform for storage and transportation. The removable central section, or front wheel support, is removed for use and placed beneath the front wheel of the bicycle. Friction between the surface below and the removable front wheel support prevents motion of the front wheel, stabilizing the handle bars.

The platform itself, in either embodiment, is constructed from any material sufficiently stiff to maintain its shape and support the weight of a bicycle and a rider. For example, the platform may be made of wood or plastic. Wood construction may be a solid member, or a series of layered wood veneers that are pressed into a shape and cut to size. Plastic construction may be as a single molded piece, or multiple pieces. Plastic molding may be solid or with an internal lattice structure that allows the platform to maintain stiffness while reducing material cost and weight.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
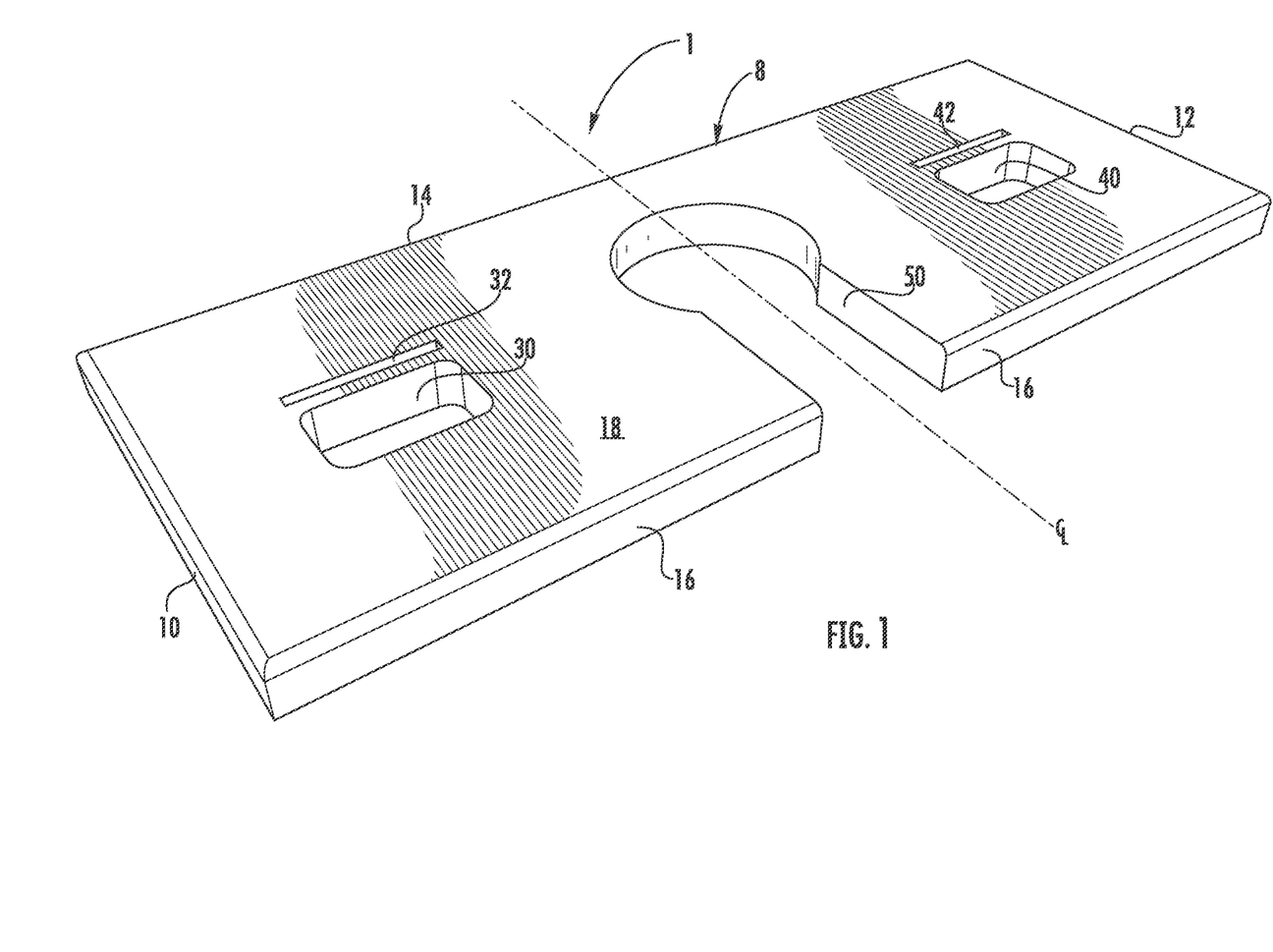
FIG. 1 illustrates a first embodiment of a bicycle training aid.
Figure 2:
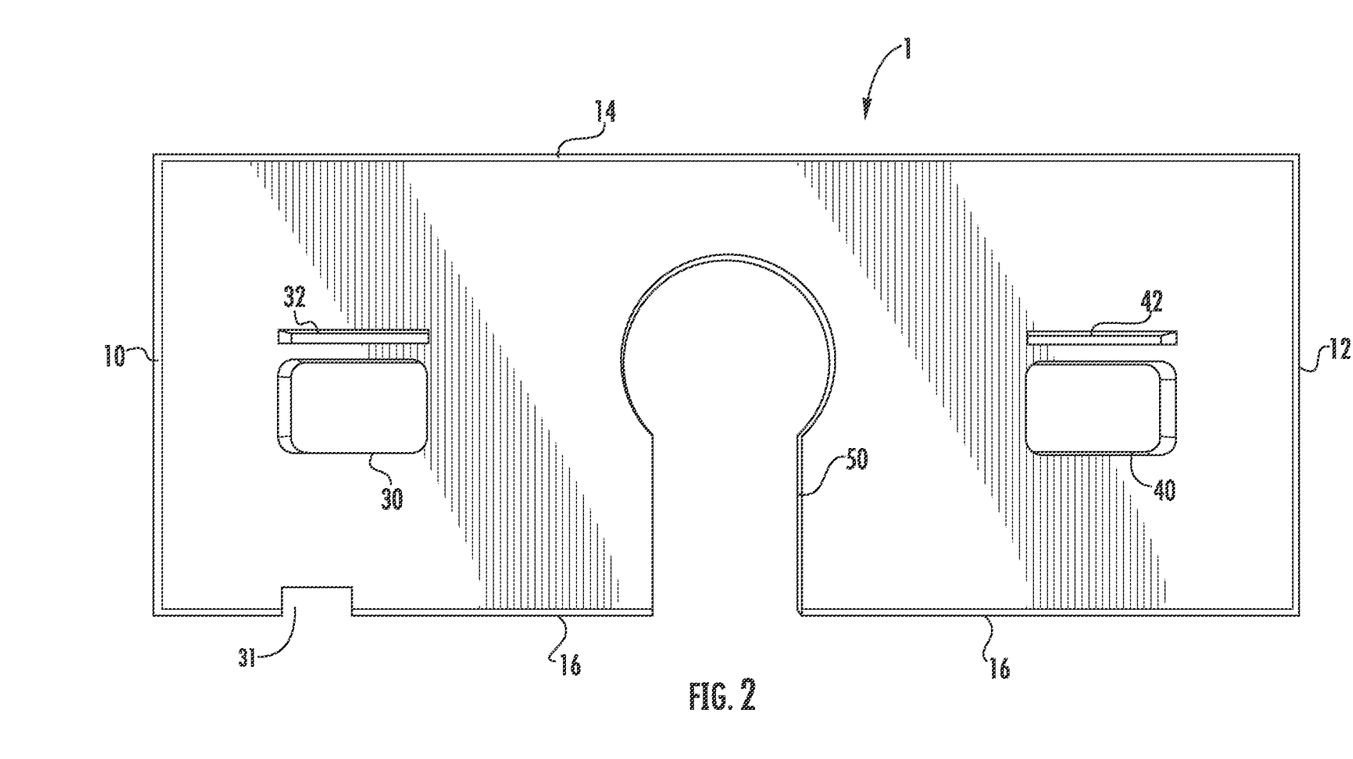
FIG. 2 illustrates a top view of the first embodiment of the bicycle training aid.

Referring to FIGS. 1 and 2, a first embodiment of a bicycle training aid is shown. The bicycle training aid 1 includes stabilization platform 8, which includes a left surface 10, right surface 12, rear surface 14, front surface 16, top surface 18, and bottom surface 20.

A first wheel cavity 30 is placed to one side of the stabilization platform 8, the first wheel cavity 30 to interface with a training wheel (not shown). A first strap slot 32 is placed adjacent to the first wheel cavity.

In some embodiments, a strap channels 31 may be located on the front surface 16 aligned with the wheel cavities 30/40. The strap channel 31 provides additional horizontal stability for the optional cinch straps 34/44.

A second wheel cavity 40 is placed in a mirrored position with respect to the centerline of the stabilization platform 8. A corresponding second strap slot 42 is placed near the second wheel cavity 40.

The center of the stabilization platform 8 includes central wheel slot 50 to allow for free motion of the bicycle's rear wheel (not shown). The central wheel slot 50 is open on one end, separating the front surface 16 into two surfaces. The benefit of having an open end is that the bicycle 70 can be rolled onto the stabilization platform 8 with minimal lifting.

Figure 3:
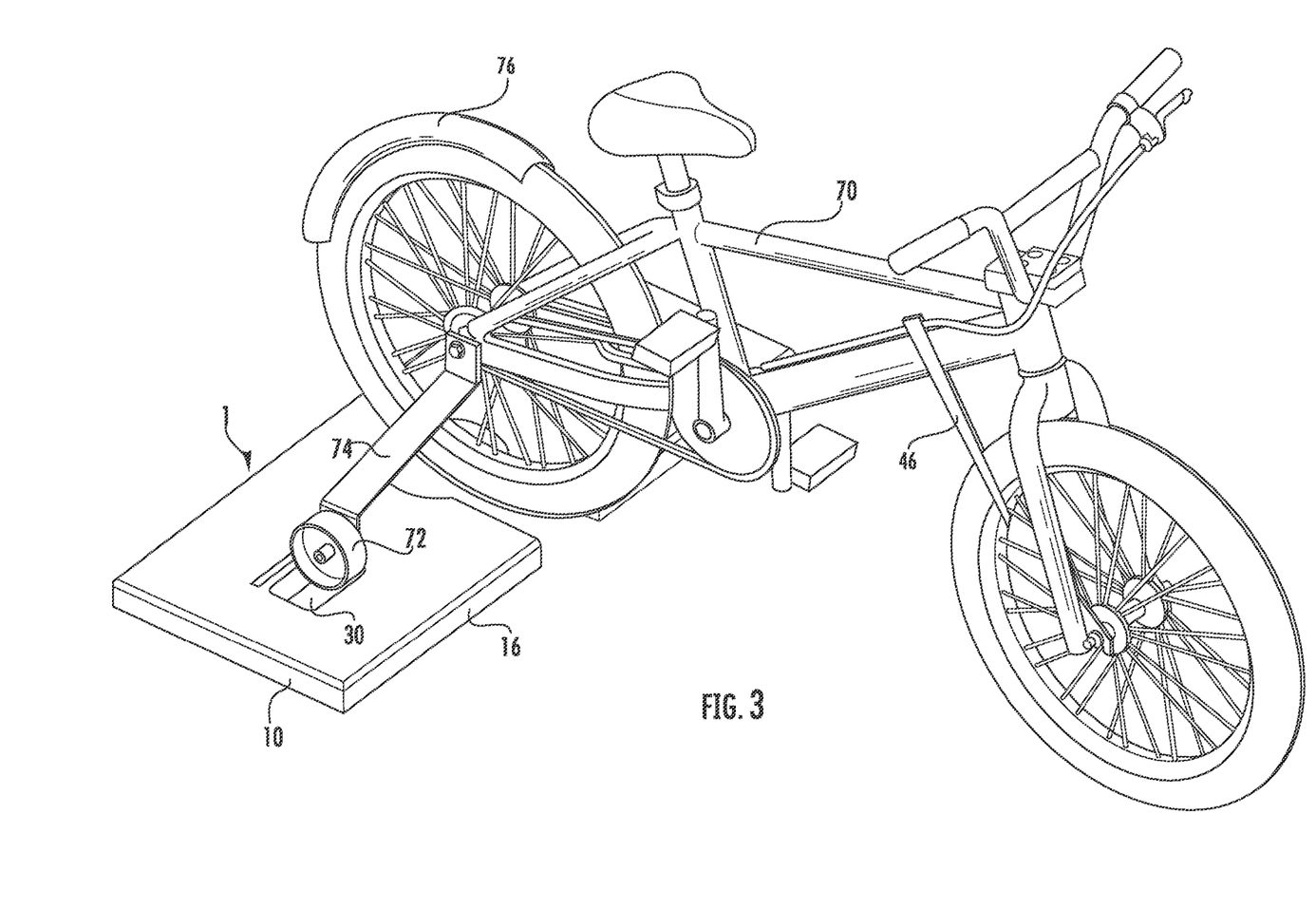
FIG. 3 illustrates a bicycle interfaced with the first embodiment of the bicycle training aid.

Referring to FIG. 3, a bicycle interfaced with the first embodiment of the bicycle training aid is shown.

Bicycle 70 includes training wheels 72 and training wheel brackets 74. Optional fender 76 encloses part of the bicycle rear wheel 78. The optional fender 76 affixes to the bicycle 70, by methods commonly known in the art. An optional third cinch strap 46 is shown connecting the bicycle down tube 82 to the bicycle front wheel 80, limiting or preventing the turning motion of the handlebars 84.

Figure 4:
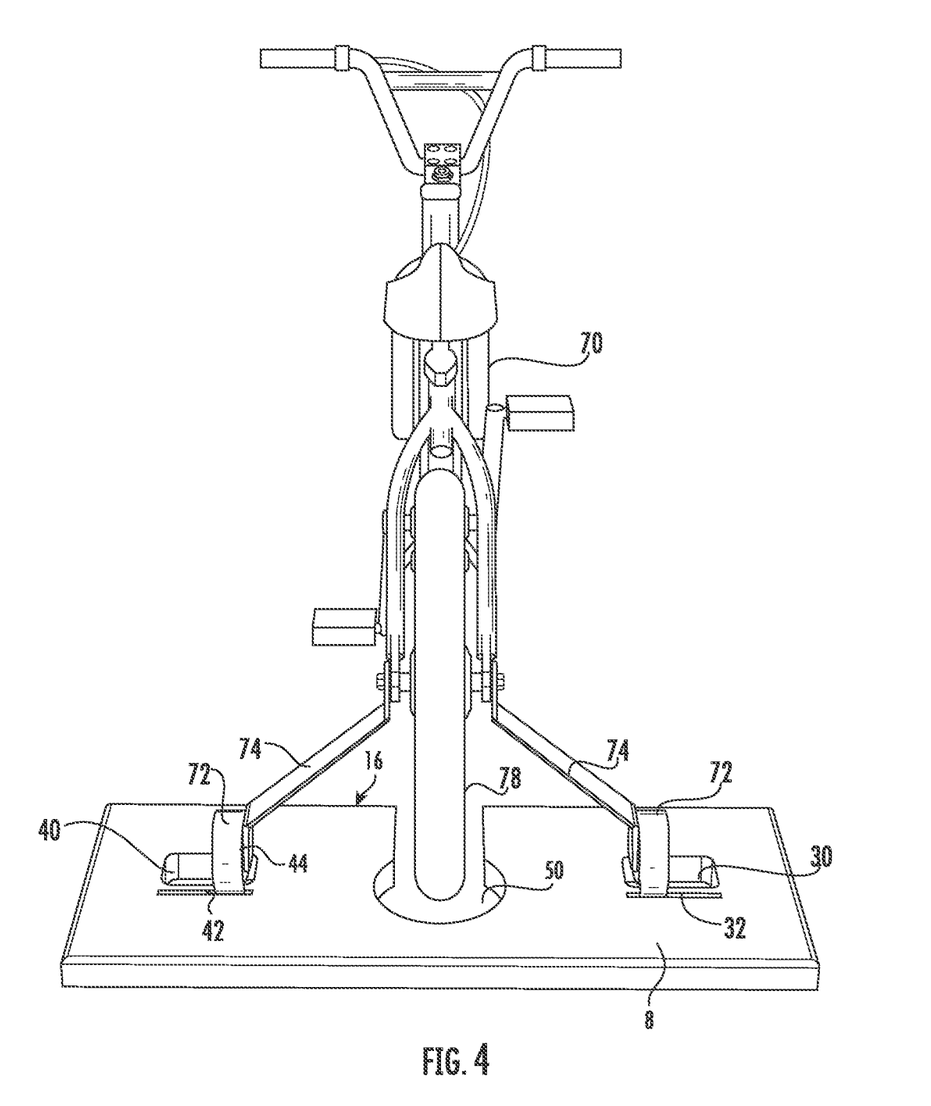
FIG. 4 illustrates a rear view of a bicycle interfaced with the first embodiment of the bicycle training aid.

Referring to FIG. 4, a rear view of a bicycle interfaced with the first embodiment of the bicycle training aid is shown.

Shown within stabilization platform 8 are first wheel cavity 30 with first cinch strap 34 shown passing through first strap slot 32 and around the front surface 16. Also shown is second wheel cavity 40 with second cinch strap 44 passing through second strap slot 42 and around the front surface 16.

The central wheel slot 50 is shown with the bicycle rear wheel 78 within, allowing the wheel 78 to freely rotate.

Figure 5:
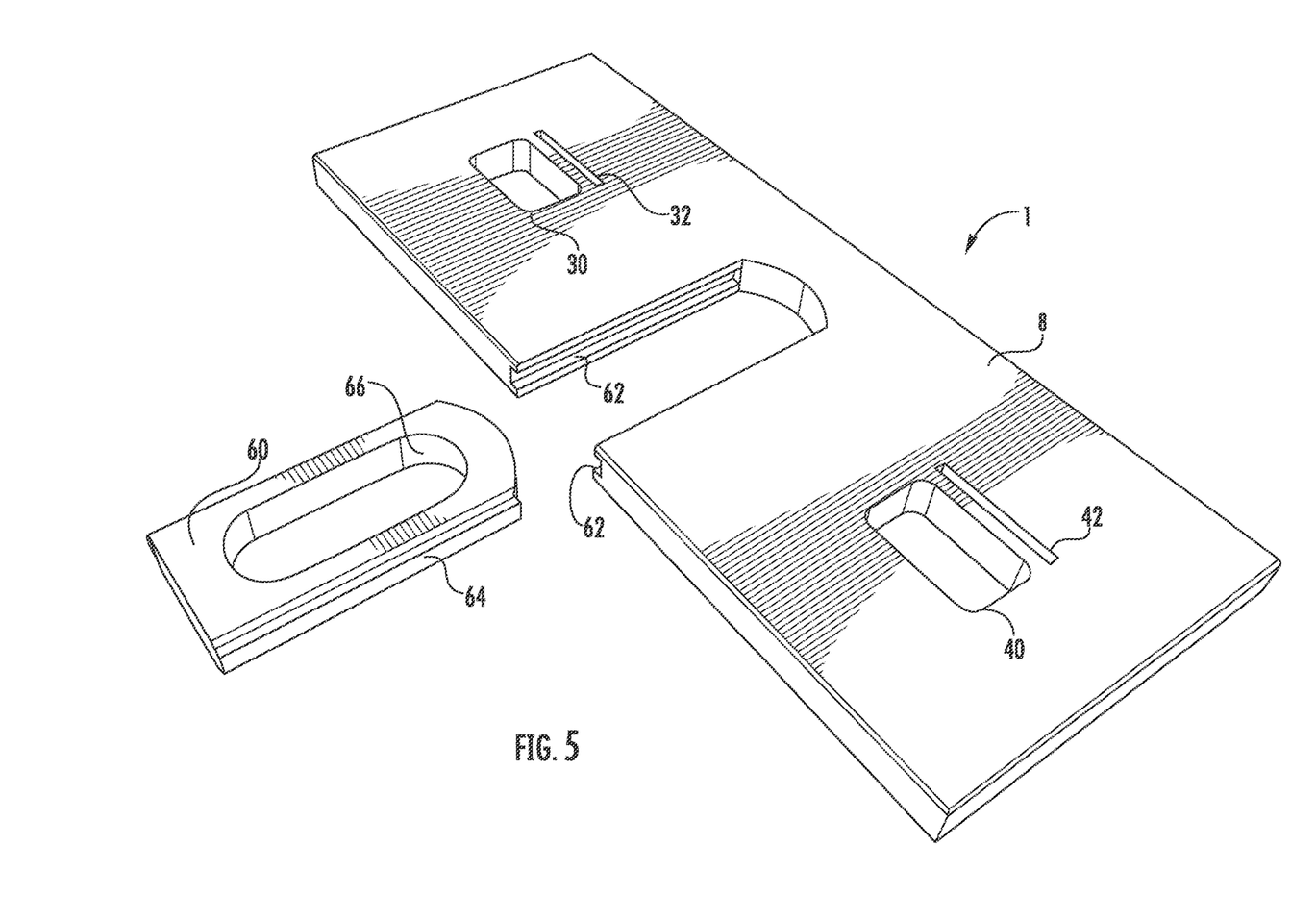
FIG. 5 illustrates a second embodiment of a bicycle training aid.
Figure 6:
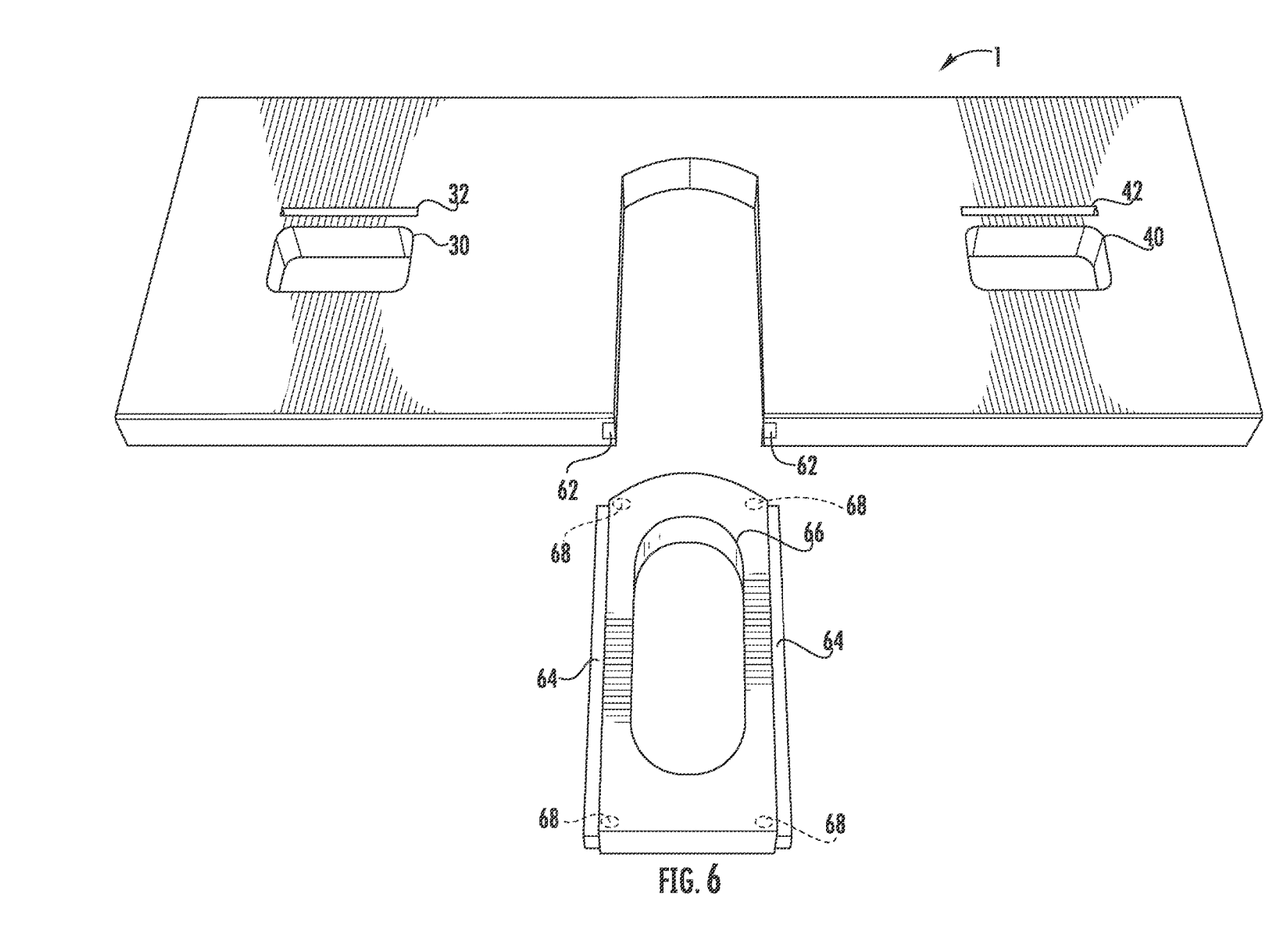
FIG. 6 illustrates a front perspective view of the second embodiment of the bicycle training aid.

Referring to FIGS. 5 and 6, a second embodiment of a bicycle training aid is shown.

The second embodiment includes a removable front wheel support 60. The removable front wheel support 60 slides out of the stabilization platform 8. The interface between the removable front wheel support 60 and platform 8 is a groove 62 and rail 64.

A wheel containment cavity 66 holds the front wheel of the bicycle (not shown). The cavity 66 includes a bottom that prevents the front wheel of the bicycle from contacting the underlying surface. Optional support feet 68 are placed under the removable front wheel support 60, increasing the friction between the removable front wheel support 60 and the underlying surface. The optional support feet 68 may be made of rubber or other suitable high-friction material.

Figure 7:
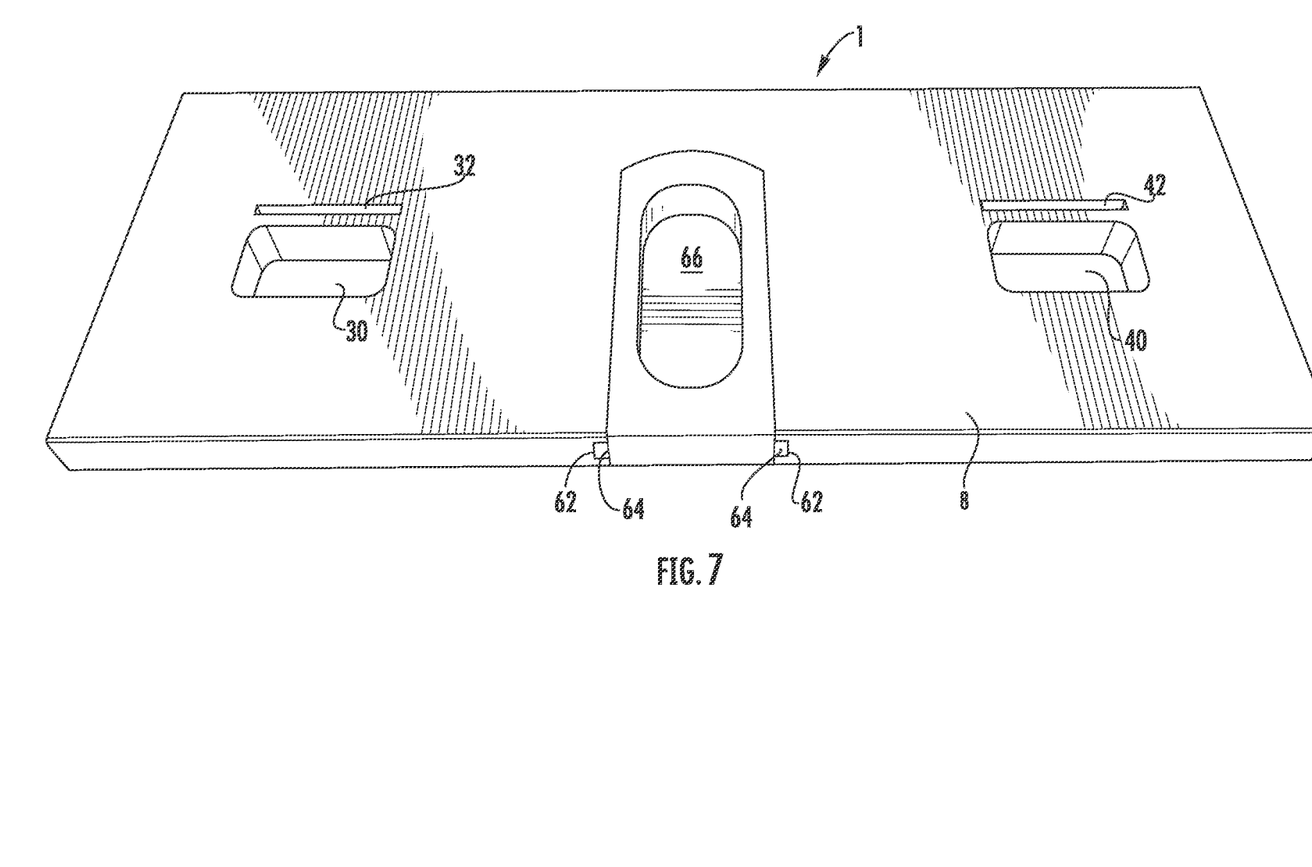
FIG. 7 illustrates a view of the second embodiment of the bicycle training aid packed for storage.

Referring to FIG. 7, a view of the second embodiment of the bicycle training aid packed for storage is shown.

The removable front wheel support 60 is installed within the stabilization platform 8 using the combination of the groove 62 and rail 64, allowing for storage or transportation.

Figure 8:
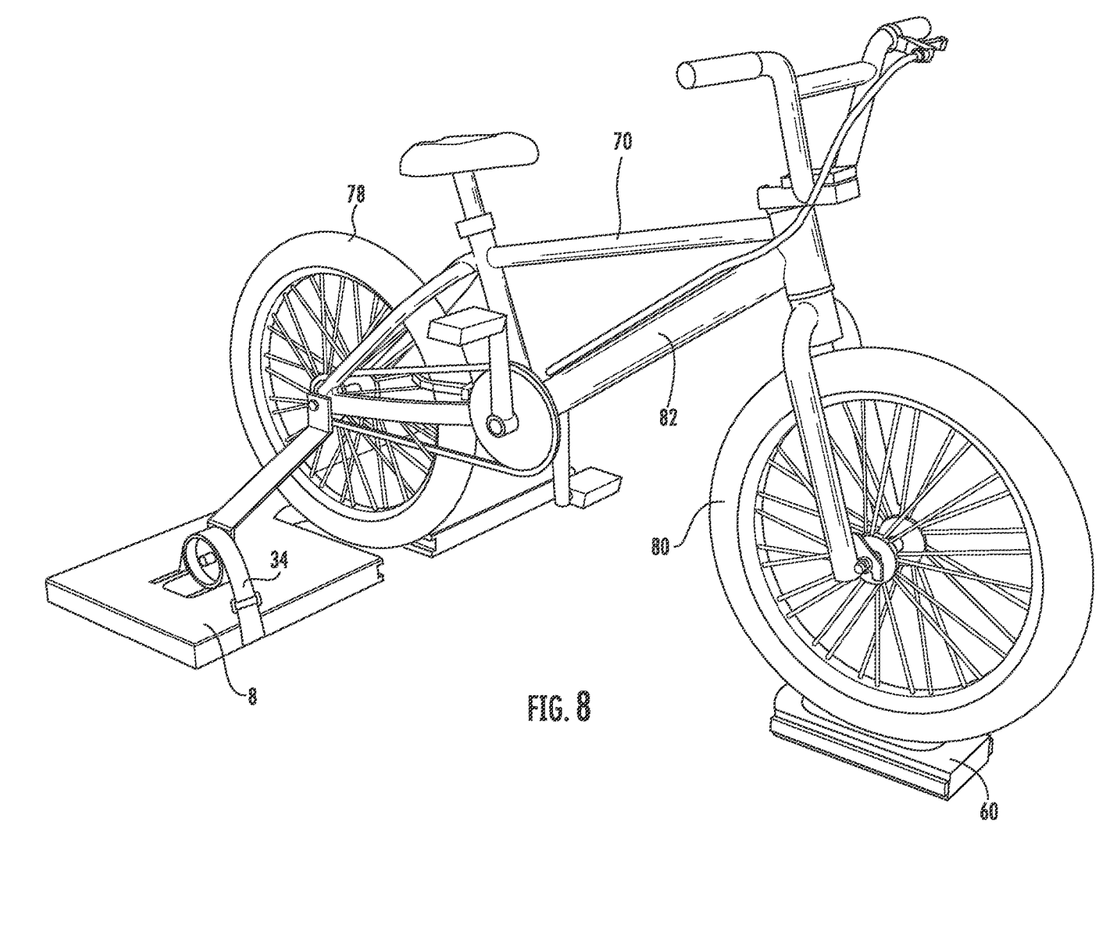
FIG. 8 illustrates a bicycle in use with the second embodiment of the bicycle training aid.

Referring to FIG. 8, a bicycle in use with the second embodiment of the bicycle training aid is shown.

The bicycle front wheel 80 sits within the removable front wheel support 60, stabilizing the bicycle front wheel 80, and thereby the handlebars.

Equivalent elements can be substituted for the ones set forth above such that they perform in substantially the same manner in substantially the same way for achieving substantially the same result. It is believed that the system and method as described and many of its attendant advantages will be understood by the foregoing description.

It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device to stabilize a child's bicycle for practice, the child's bicycle including a front wheel, rear wheel, two training wheels, handlebars, and down tube, the device comprising:
    a platform that supports the training wheels within training wheel cavities;
        the platform elevating the rear wheel to prevent contact with an underlying surface;
        the rear wheel permitted to turn freely;
    the platform comprised of:
        a left surface, a right surface, a rear surface, a front surface, a top surface, and a bottom surface;
        a central wheel slot separating the front surface into two surfaces;
    whereby the child's bicycle is placed onto the platform, allowing for bicycle riding practice without concern of the bicycle tipping over.

2. The device of claim 1, wherein the cavities are a first cavity and a second cavity, the first cavity for engaging a first training wheel, the second cavity for engaging a second training wheel.

3. The device of claim 2, wherein the platform includes the central wheel slot, the central wheel slot providing sufficient space for unhindered movement of the rear wheel without the rear wheel contacting the platform or the underlying surface.

4. The device of claim 1, further comprising:
    a removable front wheel support;
    the removable front wheel support including wheel containment cavity to interface with the front wheel, preventing the front wheel from rotating, and thereby stabilizing the handlebars.

5. The device of claim 1, further comprising:
    a strap slot located adjacent to each training wheel cavity, resulting in a first strap slot and a second strap slot;
    the first strap slot to receive a first cinch strap, the second strap slot to receive a second cinch strap;
    the first cinch strap and second cinch strap to tighten around the training wheels and through the platform, thereby securing the bicycle to the platform.

6. The device of claim 1, further comprising:
    a removable front wheel support;
    the removable front wheel support slidably interfacing with the central wheel slot;

whereby the removable front wheel support is detached from the platform and placed beneath the bicycle front wheel, immobilizing the bicycle front wheel to increase bicycle stability.

7. The bicycle support device of claim 6, further comprising a fender, the fender at least partially covering the rear wheel.

8. A device to support a bicycle with a first training wheel and a second training wheel, the device stabilizing the bicycle while allowing a bicycle rear wheel to spin freely, the device comprising:
- a stabilization platform having a substantially planar shape;
- the stabilization platform including:
  - a central wheel slot partially surrounding, without contacting, the rear wheel of the bicycle;
  - a first wheel cavity and a second wheel cavity;
  - the first wheel cavity and second wheel cavity interfacing with the first and second training wheels to elevate and support the bicycle;
- a first cinch strap and a second cinch strap;
- wherein the first cinch strap passes over the first training wheel, through a first strap slot, under the stabilization platform, and around to the first training wheel;
- wherein the second cinch strap passes over the second training wheel, through a second strap slot, under the stabilization platform, and around to the second training wheel;
- the first and second cinch strap constructed to tighten around the first and second training wheels, securing the first and second training wheels to the stabilization platform;
- whereby the bicycle is positioned to place the first and second training wheels within the first wheel cavity and second wheel cavity, rendering the bicycle stationary, and allowing the rear wheel to rotate within the central wheel slot.

9. The device of claim 1, wherein the stabilization platform further comprises:
- the first strap slot adjacent to the first wheel cavity; and
- the second strap slot adjacent to the second wheel cavity.

10. The device of claim 1, further comprising:
- a removable front wheel support;
- the removable front wheel support slidably interfacing with the central wheel slot;
- whereby the removable front wheel support is detached from the stabilization platform and placed beneath a bicycle front wheel, immobilizing the bicycle front wheel to increase bicycle stability.

11. The device of claim 1, further comprising:
- a third cinch strap;
- wherein the third cinch strap connects a bicycle down tube with a bicycle front wheel, thereby stabilizing the bicycle front wheel.

12. The device of claim 1, the stabilization platform comprised of:
- a left surface, a right surface, a rear surface, a front surface, a top surface, and a bottom surface;
- the central wheel slot separating the front surface into two surfaces.

13. The device of claim 12, further comprising:
- a removable front wheel support;
- the removable front wheel support slidably interfacing with the central wheel slot;
- whereby the removable front wheel support is detached from the stabilization platform and placed beneath a bicycle front wheel, immobilizing the bicycle front wheel to increase bicycle stability.

14. A bicycle support device for stabilizing a bicycle with training wheels, the bicycle support device comprising:
- a platform, the platform having:
  - a first wheel cavity and a second wheel cavity; and
  - a central slot;
- a front wheel stabilizer,
  - the front wheel stabilizer having a center cut out;
  - whereby a front wheel of the bicycle interfaces with the center cut out of the front wheel stabilizer,
- a front wheel stabilization strap;
  - the front wheel stabilization strap wrapped around a bicycle frame and the front wheel securing the orientation of the front wheel;
- wherein the first wheel cavity supports a first training wheel and the second wheel cavity supports a second training wheel; and
- wherein when the first and second training wheels interface with the first and second wheel cavities a rear wheel of the bicycle aligns with the central slot and rotates freely.

15. The bicycle support device of claim 14, further comprising:
- a first strap slot adjacent to the first wheel cavity;
- a second strap slot adjacent to the second wheel cavity;
- a first strap; and
- a second strap;
- whereby the first strap passes through the first strap slot and over the first training wheel to secure the first training wheel to the platform; and
- whereby the second strap passes through the second strap slot and over the second training wheel to secure the second training wheel to the platform.

16. The bicycle support device of claim 14, further comprising a fender, the fender at least partially covering the rear wheel.

* * * * *